May 27, 1930. A. A. THOMAS 1,760,383
APPARATUS FOR TRANSMITTING AND AMPLIFYING ELECTRIC IMPULSES
Filed Sept. 24, 1926
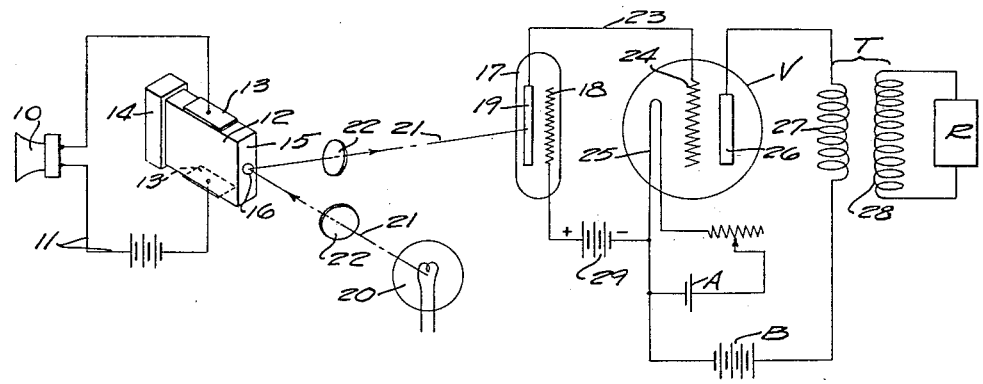
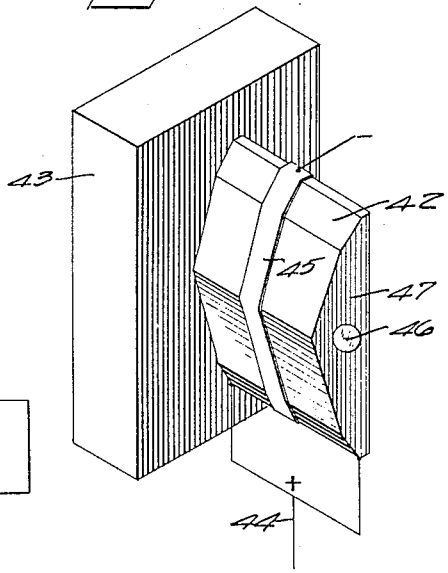
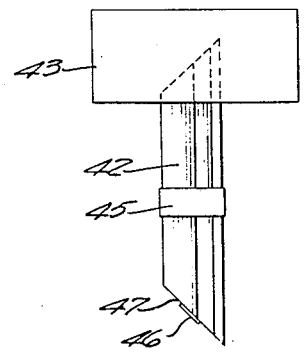
INVENTOR
Adolph A. Thomas Patented May 27, 1930

1,760,383

UNITED STATES PATENT OFFICE

ADOLPH A. THOMAS, OF NEW YORK, N. Y.

APPARATUS FOR TRANSMITTING AND AMPLIFYING ELECTRIC IMPULSES

Application filed September 24, 1926. Serial No. 137,394.

My invention is for novel methods and means for transmitting and amplifying electric impulses. One of the practical uses of my invention is in the art of recording and broadcasting sound, although it is not limited to those special fields.

Briefly stated, the basic feature of my invention comprises a piezo-electric crystal carrying a small mirror, which by variable reflected light controls the action of a photo-electric cell or similar device. The piezo-electric crystal is so connected in circuit that it vibrates mechanically in response to variable electric impulses to which it is subjected. If my system is employed in the recording of sound, a suitable transmitter is connected in the crystal circuit to produce electric impulses in accordance with the sound waves actuating the transmitter. These variable electric impulses cause mechanical vibration of the piezo-electric crystal. A tiny mirror is directly mounted on the crystal so as to be actuated by the vibratory movements of the crystal. The mirror is so arranged that it reflects rays of light against the electron-emitting cathode of a photo-electric cell, which is properly connected in an amplifying circuit adapted to control or operate suitable mechanism. As the mirror vibrates with the crystal, the amount of light thrown on the photo-electric cell is correspondingly varied and this causes the cell to produce amplified current variations in the output circuit.

In order to explain my invention so that those skilled in the art may understand and practice the same, I shall describe a simple embodiment thereof, as applied to sound recording, it being understood that this is merely by way of example and not in a limitative sense. In the accompanying drawings, which form part of this specification, Fig. 1 illustrates diagrammatically a sound-recording system embodying the idea of my invention;

Fig. 2 shows a crystal of Rochelle salt carrying a mirror on one of its faces; and Fig. 3 is a plan view of Fig. 2.

Referring to Fig. 1, there is a suitable telephone transmitter 10 connected in a battery circuit 11, which also includes a piezo-electric element 12. To make the drawing as simple and clear as possible, I have shown element 12 as a rectangular piece intended to represent a piezo-electric crystal of any suitable type or any operative section of such crystal. Among crystals possessing a piezo-electric character I may mention quartz, fluorspar, topaz, tourmaline and Rochelle salt. Perhaps the two most practical crystals are quartz and Rochelle salt, the latter being piezo-electric in a greater degree than the others. While quartz is only moderately piezo-electric, it possesses a mechanical strength that gives it certain advantages over other crystals. The selection of a suitable crystal, or section of crystal, lies within the skill of the experimenter.

The conductors 11 are electrically connected to crystal 12 in any practical way, as by means of tin foil coatings 13 attached to opposite poles or faces of the crystal. The points at which the crystal is connected in circuit will manifestly depend upon the particular kind of crystal used. It is sufficient to say that in Fig. 1 the upper and lower faces of the crystal represent electrically opposite poles such that, when a variable electric pressure is applied, the crystal vibrates mechanically in accordance with the impressed voltage. One end of the crystal is rigidly mounted on a base or support 14, which should be sufficiently heavy and solid to be non-vibratory, or practically so. The free or vibrating end 15 of the crystal carries a very small mirror 16, which is suitably secured in position, as by cement or otherwise.

A photo-electric cell of any practical construction is diagrammatically indicated at 17, and has the usual electrodes 18 and 19. Element 18 is the anode in the form of a grid and element 19 is the cathode which is constructed of (or coated with) light-sensitive material adapted to emit electrons in the operation of the cell. There are various makes of these cells on the market and their construction is well understood. In one form of cell known to the public, the cathode consists of a plate carrying a deposit of alkali metal, which has the property of releasing electrons in accordance with the amount or intensity of light that strikes the cathode at any instant. In other words, the output of the cell depends upon the degree of illumination impressed upon the cathode.

The mirror 16 and cell 17 are so arranged that a beam of light from lamp 20 falls upon the mirror and is reflected upon cathode 19, as indicated by lines 21. Condensing lenses 22 concentrate the light from lamp 20 as a spot on mirror 16 and electrode 19. Lamp 20 is preferably an electric bulb of proper constant light intensity, but any other suitable source of illumination may be employed. It is clear from Fig. 1 that, when the mirror 16 vibrates, the amount of light thrown on cathode 19 is correspondingly varied. The cathode is connected by a conductor 23 to the grid 24 of an amplifier tube V, which also has the usual filament 25 and plate 26. A battery A heats the filament, and a battery B feeds the plate circuit, which includes an operative coil 27. In the present instance, the coil 27 represents the primary of a transformer T, the secondary 28 of which controls or operates suitable mechanism R. When my invention is used for sound recording, mechanism R represents any practical construction of recording tool adapted to be operated by current impulses in the secondary coil 28. When the sounds that actuate the transmitter 10 are to be broadcast, mechanism R may be regarded as diagrammatically representing suitable broadcasting apparatus. A battery 29 is connected at the positive pole to the anode 18 of photoelectric cell 17, and the negative side of the battery is connected to the filament 25 of amplified tube V. It is understood that one or more amplifying tubes may be used.

The operation of the sound-recording system above described will now be clear to those familiar with this art, but I may summarize the same in a few sentences: When the transmitter 10 is actuated by sound waves, the varying difference of potential impressed upon the crystal 12 causes the same to vibrate mechanically. Consequently, the mirror 16 vibrates in accordance with the sound waves impressed upon the transmitter, and the movements of the mirror vary the quantity of light falling on cathode 19. The result is a corresponding change in the electronic output of the cathode, whereby the resistance of the circuit of battery 29 is varied. The effect of this is to vary the potential on grid 24, which controls the current impulses in the plate circuit of tube V, as will be understood without further explanation. Therefore, the minute mechanical movements of crystal 12 are ultimately translated into current impulses in coil 28 sufficient to operate a recording tool or any other practical device.

Figs. 2 and 3 show a crystal 42 of Rochelle-salt embedded at one end in a suitable base or support 43. A lead 44 is connected to the two positive ends of the crystal, and a band 45 of tin foil or other conductor is firmly attached to the central or negative portion of the crystal. A mirror 46 is secured to the crystal face 47. Otherwise, what has been said about the operation of mirror 16 in Fig. 1 applies to mirror 46. It is hardly necessary to explain that the modified construction of Figs. 2 and 3 may be substituted in Fig. 1 for crystal 12.

The sound-actuated device 10 may be of any approved type adapted to produce variable electric pressure at the opposite poles of the piezo-electric crystal. By separating the crystal from the transmitter, it is possible to locate the crystal in a different room free from the disturbing vibratory effects of the sound waves that are being produced in another room for recording or broadcasting. In other words, the mirror movements are mechanically independent of the transmitter vibrations. Further, the use of a piezo-electric crystal actuating a mirror dispenses with electromagnetic mechanism heretofore employed for translating electric impulses into mechanical movements. Thus, I have produced a sound-transmitting system of marked simplicity and improved operation.

When I speak of a piezo-electric crystal in the description and the claims, I do not necessarily mean a complete crystal, but I include any part or section of a crystal that may be found to be operative. For instance, a plate, rod or bar may be cut from a crystal and used in constructing my invention. The dimensions of such a crystal section will depend upon the kind and size of crystal used. Furthermore, the direction of the most effective mechanical and electrical strain in the crystal will vary with different kinds of crystals, so that the best way of mounting a crystal is often a matter of experimentation which may readily be carried out by those skilled in the art. When I, therefore, refer to opposite ends or poles of the crystal, I mean any faces or points between which electric pressure may be applied to produce physical movement of the crystal. Also, in speaking of a photo-electric cell controlled by the light reflected from the mirror, I use the term in its broadest possible sense, both in the description and claims, to include any electric device adapted to alter the voltage or current flow in an electric circuit in accordance with the quantity or intensity of light thrown upon a light-sensitive element of the device.

As I said before, the drawings have been made as simple as possible for the sake of clearness, and they are therefore not to be considered in the nature of shop drawings. They are rather diagrammatic representations in which no effort has been made to show mechanical details correctly. In Fig.

1, only such circuit connections are shown as are necessary to understand the invention. A complete commercial apparatus for sound recording comprises many other parts, with which the present invention is not concerned.

Although I have explained my invention by means of certain constructions and arrangements, I wish to be clearly understood that I have done so merely by way of illustration, and not as a restriction or limitation of my invention. It is obvious that the novel feature of my invention may be mechanically embodied in other ways and by other means than herein set forth.

I claim as my invention:

1. A single piezo-electric element carrying a mirror rigidly mounted thereon.

2. A piezo-electric crystal having a mirror mounted flatwise on a face of said crystal so as to vibrate in unison therewith.

3. In an electric vibratory system, a piezo-electric crystal carrying a mirror attached flatwise to a face of said crystal and lying within the perimeter of said face.

4. As a new article of manufacture, a crystal of Rochelle salt provided with a mirror attached flatwise to a face of said crystal and lying wholly within the perimeter of said face.

5. As a new article of manufacture, a crystal of Rochelle salt having a mirror attached to a face of positive polarity.

6. As a new article of manufacture, a single piezo-electric element having a mirror rigidly secured to a face thereof so that said mirror and element always vibrate in unison as a single member.

ADOLPH A. THOMAS.